United States Patent
Montean (10) Patent No.: US 9,050,995 B1
(45) Date of Patent: Jun. 9, 2015

(54) DEVICE FOR TRANSPORTING REFUSE CONTAINERS AND METHOD OF USE

(71) Applicant: Donald Joseph Montean, Vineland, CA (US)

(72) Inventor: Donald Joseph Montean, Vineland, CA (US)

(*) Notice: Subject to any disclaimer, the term of this patent is extended or adjusted under 35 U.S.C. 154(b) by 0 days.

(21) Appl. No.: 14/073,941

(22) Filed: Nov. 7, 2013

Related U.S. Application Data (60) Provisional application No. 61/832,949, filed on Jun. 9, 2013.

(51) Int. Cl.
    *B62B 3/00* (2006.01)
    *B62B 13/18* (2006.01)
    *B62B 3/10* (2006.01)

(52) U.S. Cl.
    CPC .. *B62B 13/18* (2013.01); *B62B 3/10* (2013.01)

(58) Field of Classification Search
    CPC .............. B62B 1/00; B62B 3/00; B62B 9/00; B62B 11/00
    USPC .......... 280/47.35, 47.371, 8, 9, 10, 652, 79.2, 280/79.5
    See application file for complete search history.

(56) References Cited

U.S. PATENT DOCUMENTS

| | | | | |
|---|---|---|---|---|
| 3,912,290 | A * | 10/1975 | Rich | 280/9 |
| 4,116,455 | A * | 9/1978 | Dotson et al. | 280/7.12 |
| 4,139,208 | A * | 2/1979 | Kaley et al. | 280/9 |
| 4,589,668 | A * | 5/1986 | Mares | 280/8 |
| 4,863,075 | A * | 9/1989 | Romer | 222/610 |
| 5,876,047 | A * | 3/1999 | Dennis | 280/47.35 |
| 5,911,422 | A * | 6/1999 | Carpenter et al. | 280/8 |
| 6,042,122 | A * | 3/2000 | Mohr | 280/9 |
| 6,533,298 | B2 * | 3/2003 | Sims | 280/47.26 |
| 7,464,943 | B1 * | 12/2008 | Poggioli et al. | 280/9 |
| 7,823,907 | B1 * | 11/2010 | Coholan | 280/652 |
| 8,069,939 | B1 * | 12/2011 | Metzler | 280/47.35 |
| 2002/0056967 | A1 * | 5/2002 | Carrillo | 280/47.35 |

* cited by examiner

*Primary Examiner* — Hau Phan
(74) *Attorney, Agent, or Firm* — Ted Masters (57) ABSTRACT

A device for transporting a plurality of refuse containers across either a support surface or a winter support surface, includes a housing which is partitioned into a plurality of compartments, each compartment is shaped and dimensioned to receive a refuse container. A plurality of skis are removably connectable to the housing, the skis being used to move the housing across the winter support surface. Alternatively, a plurality of wheels are removably connectable to the housing, the wheels being used to move the housing across the support surface.

1 Claim, 11 Drawing Sheets

DEVICE FOR TRANSPORTING REFUSE CONTAINERS AND METHOD OF USE

CROSS REFERENCE TO RELATED APPLICATION

This application claims the filing benefit under 35 U.S.C. §119(e) of U.S. Provisional Application No. 61/832,949, filed Jun. 9, 2013, which is hereby incorporated by reference.

TECHNICAL FIELD

The present invention pertains generally to refuse disposal, and more particularly to a device for transporting a plurality of refuse containers across either a winter support surface or a non-winter support surface.

BACKGROUND OF THE INVENTION

Refuse disposal services are typically provided in residential communities. These services require the homeowner to carry full refuse containers to a location near the street where they are picked up by a disposal service provider, and then retrieve the empty containers. The refuse can include trash, garbage, compost, and various categories of recyclables such as metal, plastic, paper and the like. Since the various categories of refuse must be placed in separate containers, it is oftentimes necessary for the homeowner to make several trips in order to place the refuse containers at the curbside pickup location.

BRIEF SUMMARY OF THE INVENTION

The present invention is directed to a device for transporting a plurality of refuse containers. The device includes both skis and wheels which can be selectively interchanged to accommodate movement across either winter or non-winter terrain. The device makes the refuse disposal process more time efficient by simultaneously transporting multiple refuse containers. Moreover, the device neatly stores and separates the containers, and keeps the empty containers from blowing away in windy conditions. Typically the device would be stationed in the trash container area of a home, and as required used to transport the containers curbside for pickup. As such, the appealing features of device include light weight and mobility, ease of use, secure and organized containment of waste receptacles, convenience, durability, reduction of spent time, physical strain and potential for injury or lifting and carrying refuse containers, and ease of storage.

Also, the device is designed to accommodate a variety of container shapes and sizes, ranging from smaller plastic recycling containers to larger tall trash barrels. For example, in one embodiment the device can hold a garbage receptacle, two recycling boxes and a compost bin. In a second model it can hold a garbage receptacle and two recycling boxes. And in a third model it can hold a compost bin and two recycling boxes.

The device can be produced easily using conventional and readily available materials and manufacturing processes. Fabrication can be from a plastic such as polypropylene. Polypropylene is a high-impact plastic with excellent tensile strength and is resistant to heat chemicals. This material, which is readily available in a variety of colors is reasonable priced and is easily formed, such as by injection molding, by a wide range of plastic processors.

In accordance with an embodiment, a device for transporting a plurality of refuse containers across either a support surface or a winter support surface includes a housing which is partitioned into a plurality of compartments, each compartment is shaped and dimensioned to receive a refuse container. The device further includes a plurality of skis which are removably connectable to the housing, the skis are used to move the housing across the winter support surface. The device further includes, a plurality of wheels which are removably connectable to the housing, the wheels are used to move the housing across the non-winter support surface.

In accordance with another embodiment, an axle is connected to the housing. Two skies are shaped and dimensioned to removably connect to the axle.

In accordance with another embodiment, the skis are pivotally connectable to the axle.

In accordance with another embodiment, the skis snap onto the axle.

In accordance with another embodiment, two wheels are shaped and dimensioned to removably connect to the axle.

In accordance with another embodiment, the plurality of compartments include compartments of different lengths.

In accordance with another embodiment, the housing has a bottom. Each compartment has a base which is disposed a height above the bottom. The plurality of compartments include compartments having bases which are disposed at different heights above the bottom.

In accordance with another embodiment, the housing includes a first end compartment, an opposite second end compartment, and at least on center compartment disposed therebetween. The base of the first end compartment and the base of the second end compartment have a lower height than the base of the at least one center compartment.

In accordance with another embodiment, each compartment is vertically open so that the refuse containers can be loaded into the compartments without any interference.

In accordance with another embodiment, the housing has a bottom. A first handle is disposed at a first end of the housing, and a second handle disposed at an opposite second end of the housing. The first handle is a greater vertical distance from the bottom than the second handle.

In accordance with another embodiment, the housing includes a first side member spaced apart from a second side member. A plurality of dividers are connected between the first side member and the second side member, the dividers partitioning the housing into the plurality of compartments. A plurality of bases are connected between the first side member and the second side member, the bases serving as supports for the refuse containers.

In accordance with another embodiment, the plurality of compartments is one of two, three, and four compartments.

Other embodiments, in addition to the embodiments enumerated above, will become apparent from the following detailed description, taken in conjunction with the accompanying drawings, which illustrate, by way of example, the principles of the device and method of use.

DETAILED DESCRIPTION OF THE INVENTION

Referring initially to FIGS. 1-6, there are illustrated several views of a device for transporting refuse containers 500 (refer to FIG. 9), the device generally designated as 20. In this ski configuration, a plurality of refuse containers 500 are transported across a winter support surface 600 (such as snow or ice). Refuse containers 500 can include trash or garbage cans, paper recycling bins, metal recycling bins, plastic recycling bins, compost bins, and like items which are picked up curbside by a refuse collecting agency. Winter support surface 600 can be any support surface such as the ground, a driveway, a road, a walkway, grass, or the like which is covered with snow or ice, and which is encountered when transporting device 20 from a home to the vicinity of a road for pickup.

Device 20 includes a housing 22 which is partitioned into a plurality of compartments 24, each compartment 24 being shaped and dimensioned to receive a refuse container 500. In the shown embodiment there are four compartments 24 for holding four refuse containers 500, as can also be seen in FIG. 9. A plurality of skis 26 are removably connectable to housing 22 (refer also to FIGS. 7 and 8), skis 26 being used to move housing 22 across winter support surface 600.

Figure 7:
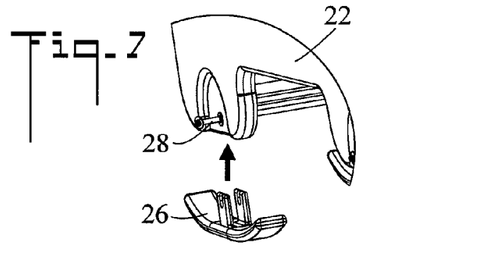
FIG. 7 is an enlarged fragmented perspective view showing a ski being attached to an axle.
Figure 8:
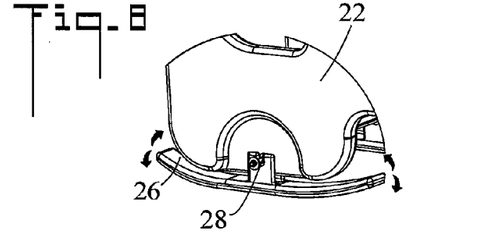
FIG. 8 is an enlarged fragmented perspective view showing the ski attached to the axle.

Also referring to FIGS. 7 and 8, an axle 28 is transversely connected to housing 22. That is, axle 28 is oriented perpendicular to the longitudinal axis 25 of device 20. In the shown embodiment axle 28 is connected near the bottom of housing 22. Two skis 26 are shaped and dimensioned to removably connect to axle 28. In the shown embodiment device 20 contains two axles 28 and four removably connectable skis 26. In the shown embodiment, skis 26 are pivotally connectable to axle 28 so that they can rotate about axle 28 (refer to FIGS. 3 and 8). Also in the shown embodiment, skis 26 snap onto axle 28.

Figure 5:
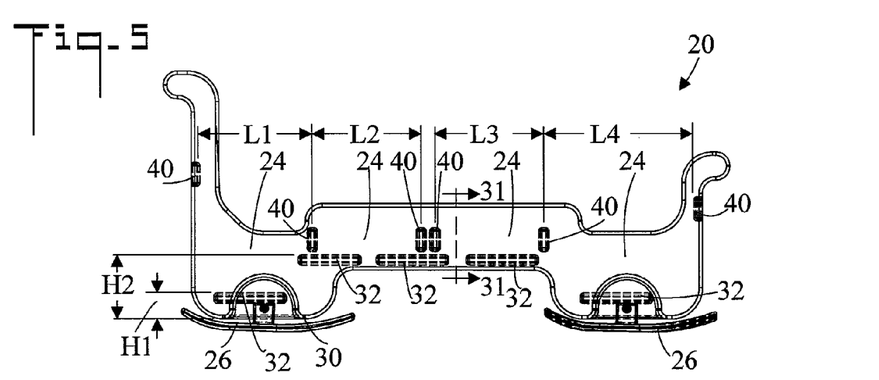
FIG. 5 is a side elevation view showing dividers and bases.
Figure 6:
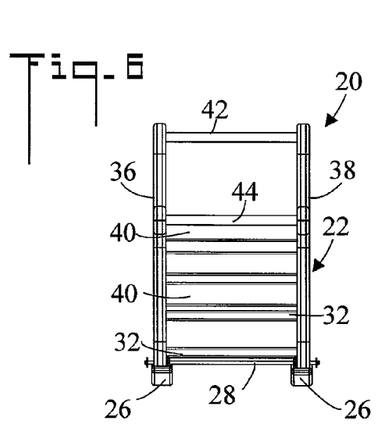
FIG. 6 is an end elevation view of the device.

Referring to FIG. 5, the plurality of compartments 24 including compartments 24 of different lengths (as measured along longitudinal axis 25 of housing 22. For example, in the shown embodiment L1 is greater than L2 and L3, and L4 is greater than L1. The different lengths are designed to accommodate different size refuse containers 500 (refer to FIG. 9). Also in an embodiment, the number of compartments 24 is one of two (refer to FIG. 27, three (refer to FIGS. 19 and 23, and four as shown in FIG. 1.

Further in FIG. 5, housing has a bottom 30 (lowest point). Each compartment 24 has a base 32 which is disposed a height above bottom 30. When loaded into housing 22, refuse containers 500 rest upon the bases 32 of their respective compartments 24 (refer to FIG. 10). The plurality of compartments 24 include compartments 24 which have bases 32 which are disposed at different heights above bottom 30. In the shown embodiment, the leftmost end compartment 24 has a base which is a height H1 above bottom 30. Conversely, the adjacent center compartment 24 has a base which is a height H2 above bottom 30, where H2 is greater than H1. Smaller heights are useful in receiving taller refuse containers 500, while larger heights are useful in receiving shorter refuse containers 500 (refer to FIG. 10). It is noted that the compartment bases 32 can be shared between compartments 24. For example in FIG. 5, the two middle compartments 24 share a portion of base 32.

Also in the shown embodiment, housing 22 includes a first end compartment 24 (left), an opposite second end compartment 24 (right), and at least one center compartment 24 disposed therebetween (two center compartments 24 as shown in FIG. 5). The base 32 of first end compartment 24 and the base of second end compartment 24 having a lower height than the base 32 of the at least one center compartment 24. As such, in this embodiment the taller refuse containers 500 are loaded in the end compartments 24.

Figures 1, 2:
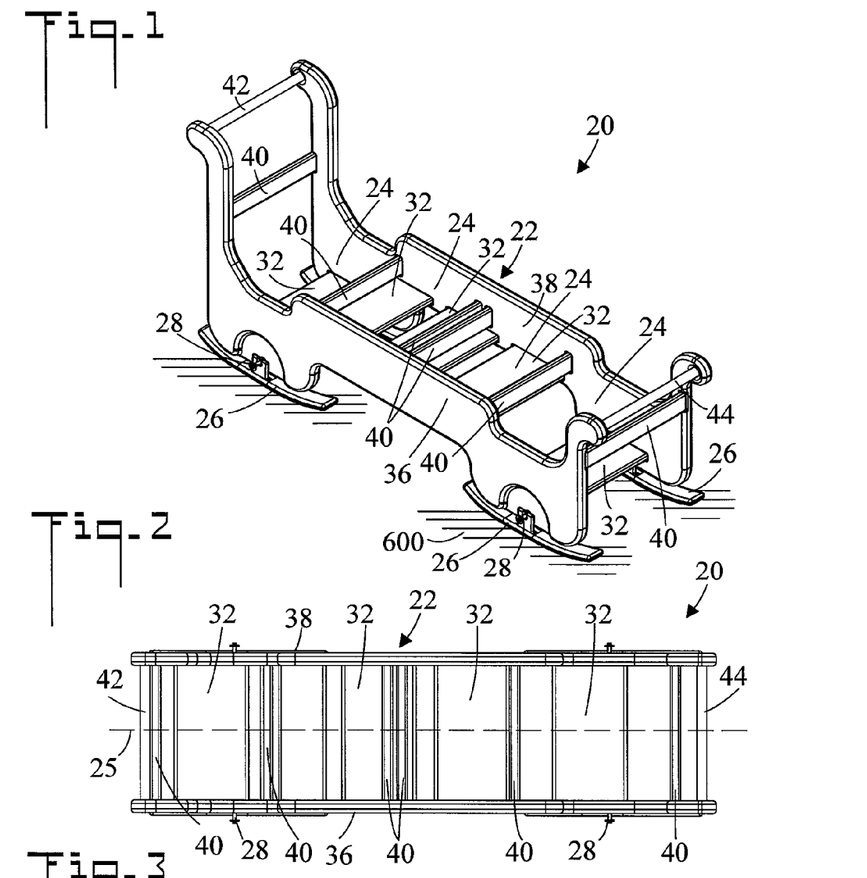
FIG. 1 is a perspective view of a device for transporting refuse containers in a ski configuration.
FIG. 2 is a top plan view of the device.
Figure 3:
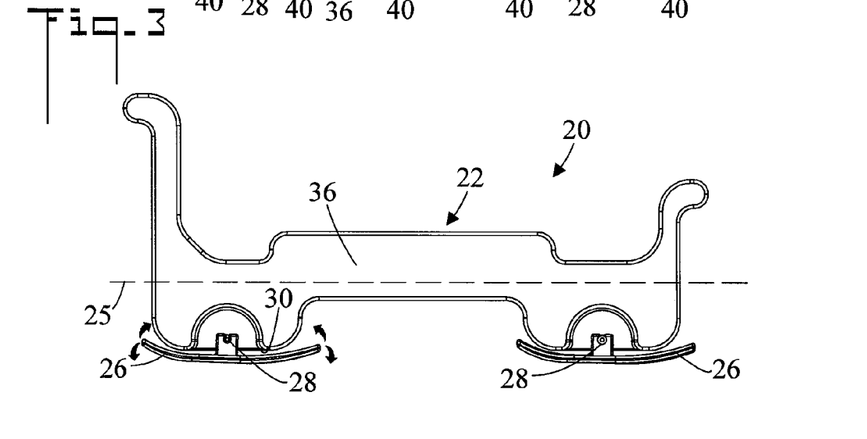
FIG. 3 is a side elevation view of the device.
Figure 4:
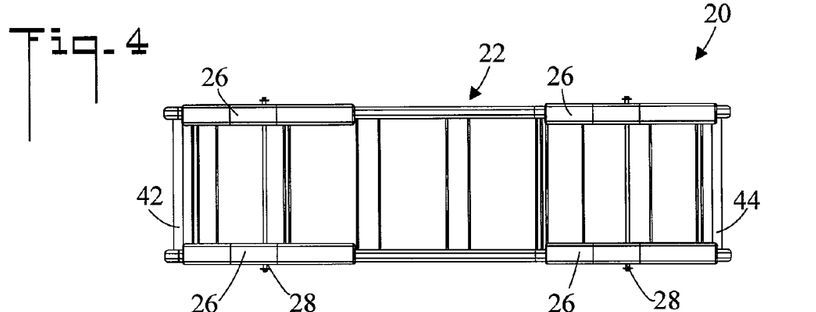
FIG. 4 is a bottom plan view of the device.

Referring particularly to FIGS. 1, 2, and 5, housing 22 includes a first side member 36 which is spaced apart from a second side member 38. A plurality of dividers 40 are connected between first side member 36 and said second side member 38, dividers 40 longitudinally partitioning housing 22 into the plurality of compartments 24. The plurality of bases 32 are also connected between first side member 36 and second side member 38, bases 32 serving as supports for refuse containers 500.

In an embodiment, a first handle 42 is disposed at a first end of housing 22, and a second handle 44 is disposed at an opposite second end of housing 22. First handle 42 being a greater vertical distance from bottom 30 than second handle 44. And, it is noted that an opposite side elevation view of device 20 is the mirror image of FIG. 3.

FIG. 7 is an enlarged fragmented perspective view showing ski 26 being attached to axle 28, and FIG. 8 is an enlarged fragmented perspective view showing ski 26 attached to axle 28. Ski 26 is positioned below axle 28, and then moved up and snapped onto axle 28. Ski 26 is rotatable about axle 28.

Figure 9:
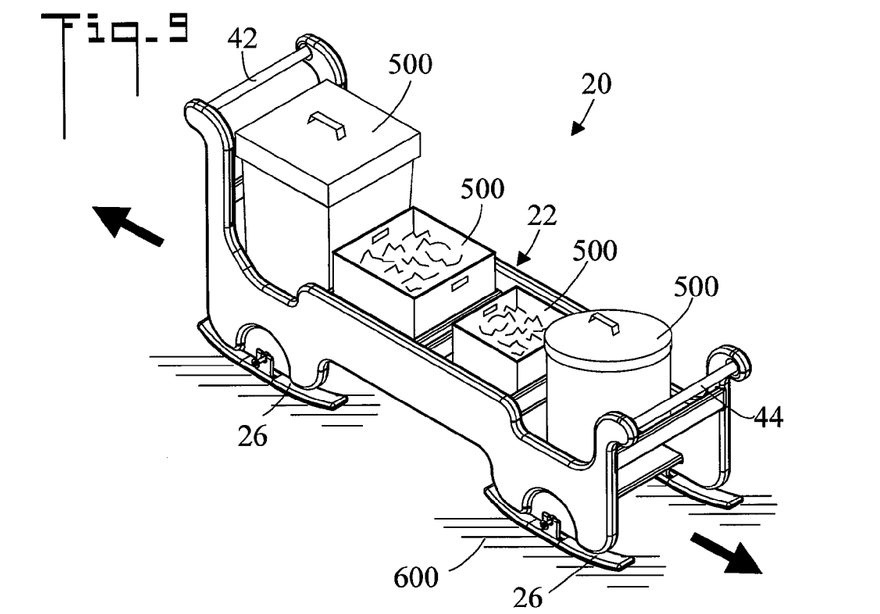
FIG. 9 is a perspective view showing the device loaded with a plurality of refuse containers.
Figure 10:
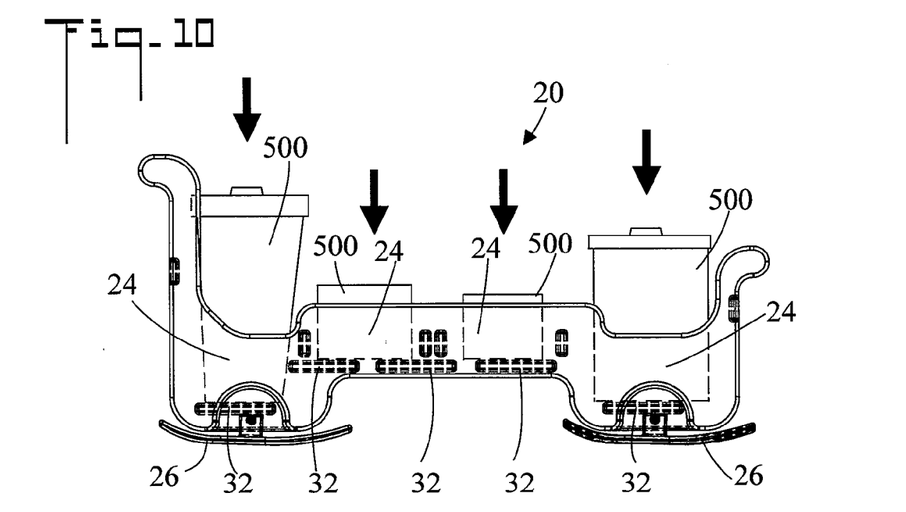
FIG. 10 is a side elevation view showing the device loaded with a plurality of refuse containers.
Figures 11, 12:
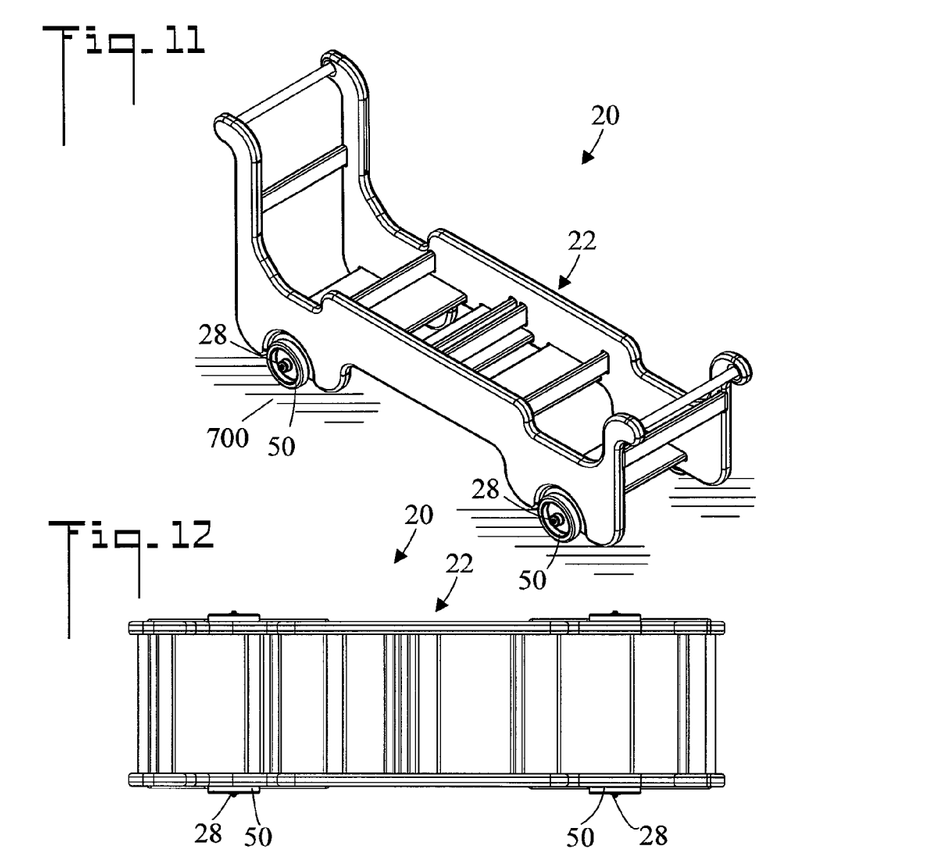
FIG. 11 is a perspective view of the device for transporting refuse containers in a wheel configuration.
FIG. 12 is a top plan view of the wheel configuration device.
Figure 13:
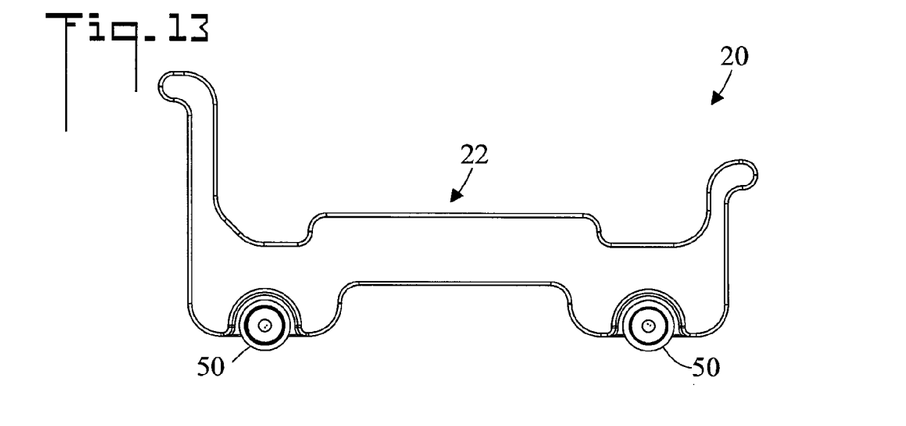
FIG. 13 is a side elevation view of the wheel configuration device.
Figure 14:
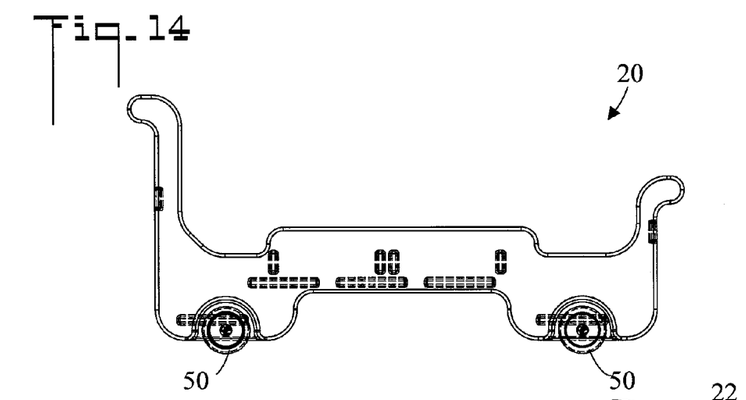
FIG. 14 is a bottom plan view of the wheel configuration device.
Figure 15:
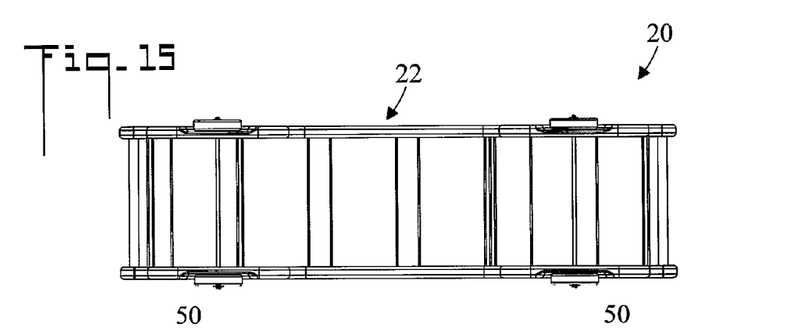
FIG. 15 is a side elevation view showing dividers and bases.
Figure 16:
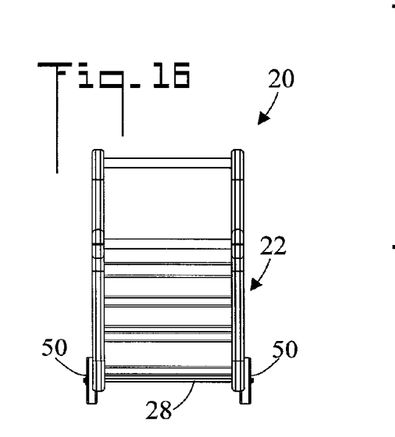
FIG. 16 is an end elevation view of the wheel configuration device.

FIGS. 9 and 10 are perspective and side elevation views respectively showing device 20 loaded with a plurality of refuse containers 500. Handles 42 and 44 can be used to push or pull device 20 across support winter support surface 600 in the direction of the arrows. Also, it is noted that each compartment 24 is vertically open so that refuse containers 500 can be loaded into compartments 24 without any interference. That is, refuse containers 500 can be readily positioned above compartments 24 and lowered into the compartments without interference from any overhead obstacles (refer to the arrows of FIG. 10).

Now referring to FIGS. 11-16, there are illustrated several views of device 20 in a wheel configuration. In the wheel configuration, a plurality of refuse containers 500 are transported across a support surface 700 such as the ground, a driveway, a road, a walkway, grass, or the like. In this configuration a plurality of wheels 50 are removably connectable to housing 22, wheels 50 being used to move housing 22 across support surface 700. As such, the plurality of skis 26 shown in FIGS. 1-10 have been replaced with a corresponding plurality of wheels 50. Other than the substitution of wheels 50 for skis 26, device 20 as shown in FIGS. 11-16 is the same as that shown in FIGS. 1-6.

Figure 17:
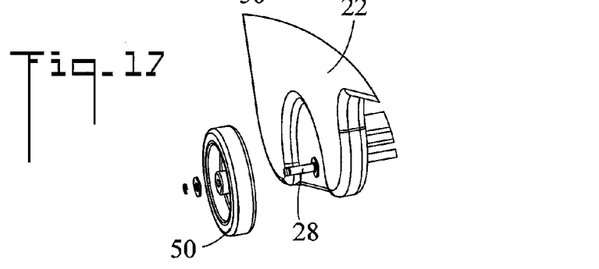
FIG. 17 is an enlarged fragmented perspective view showing a wheel being attached to an axle.
Figure 18:
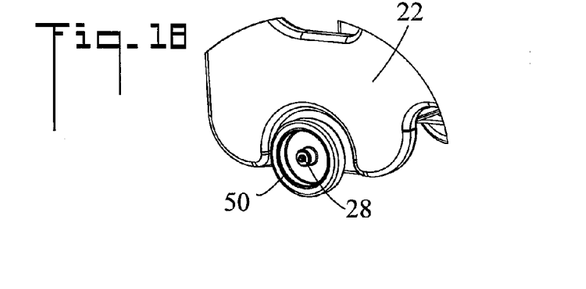
FIG. 18 is an enlarged fragmented perspective view showing the wheel attached to the axle.

FIG. 17 is an enlarged fragmented perspective view showing a wheel 50 being attached to an axle 28, and FIG. 18 is an enlarged fragmented perspective view showing wheel 50 attached to axle 50. In the shown embodiment, two wheels 50 are shaped and dimensioned to removably connect to axle 28. The connection can be by any means known in the art.

Figure 19:
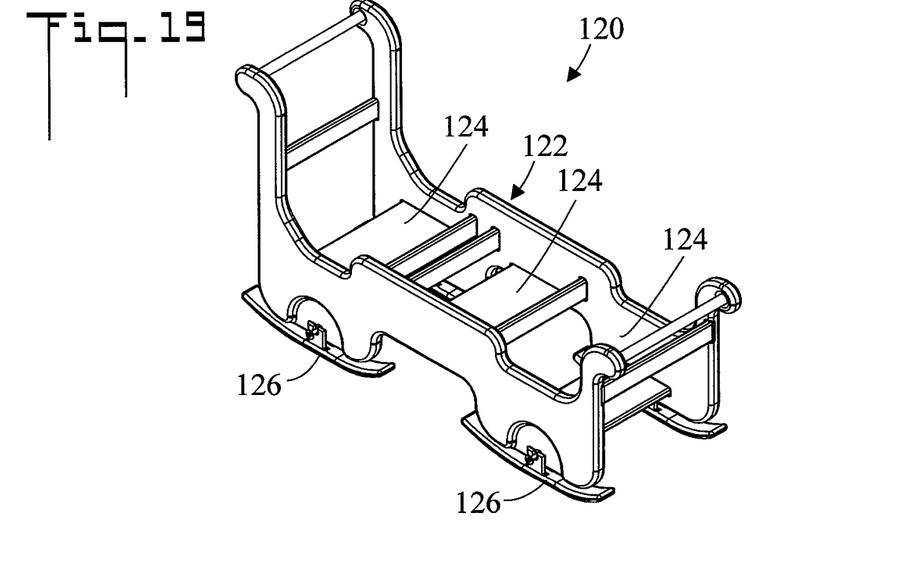
FIG. 19 is a perspective view of a second embodiment of the device.
Figure 20:
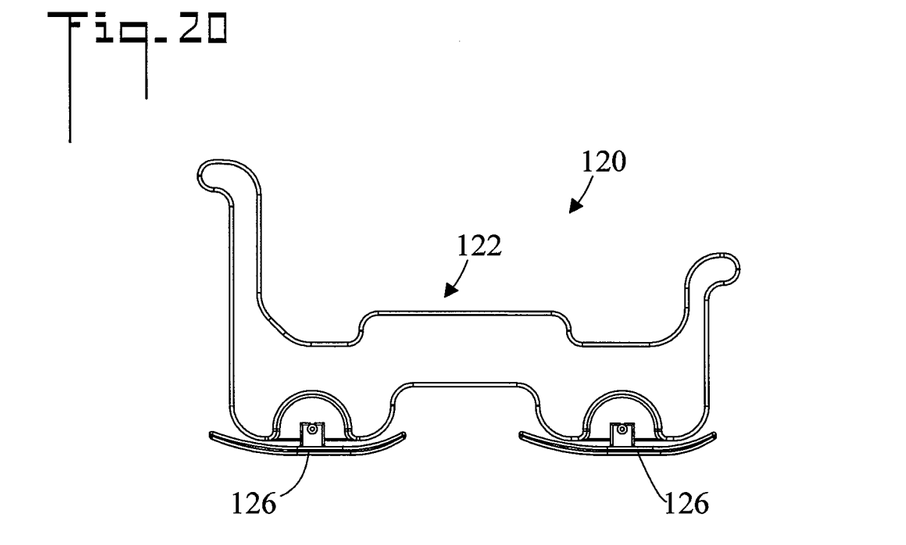
FIG. 20 is a side elevation view of the second embodiment.
Figure 21:
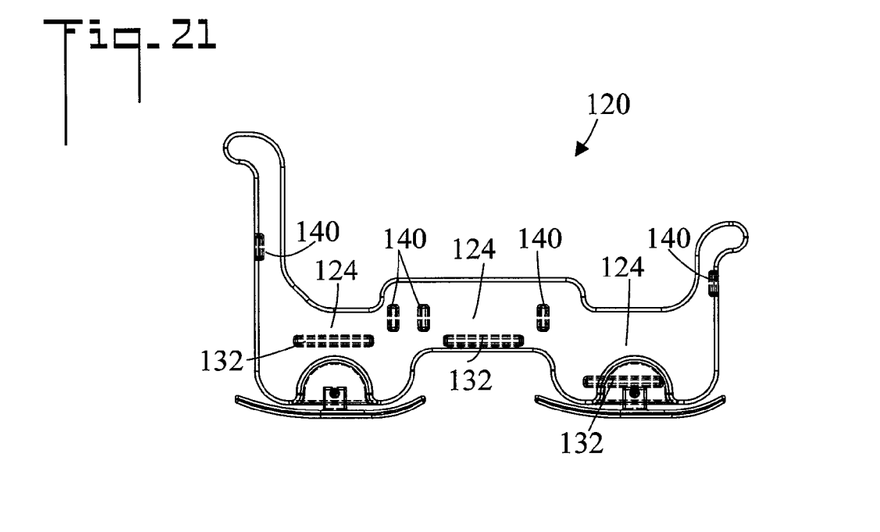
FIG. 21 is a side elevation view showing dividers and bases.
Figure 22:
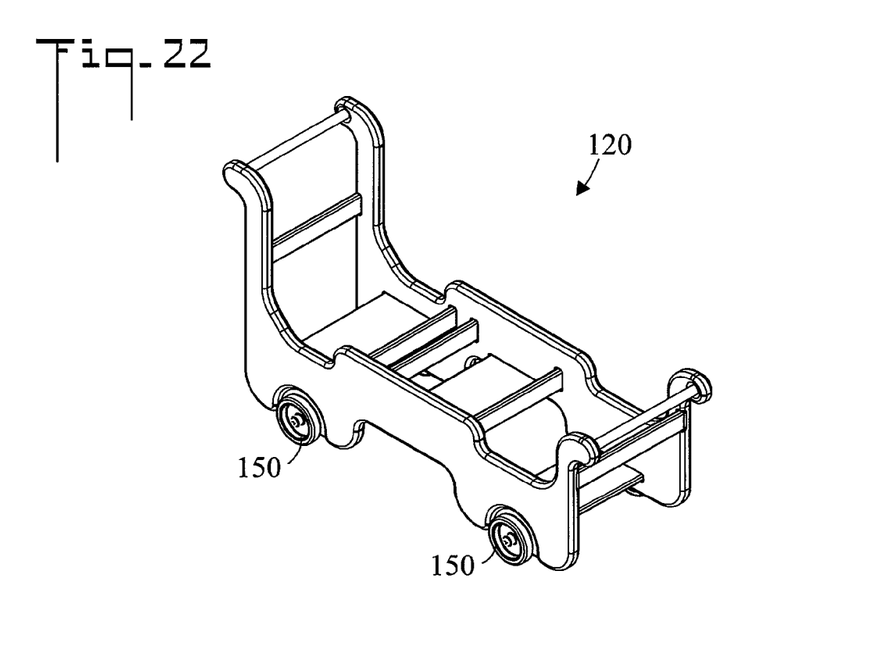
FIG. 22 is a perspective view of a wheel configuration of the second embodiment.

FIGS. 19 and 20 are perspective and side elevation views respectively of a second embodiment of the device, generally designated as 120. Second embodiment 120 is a shorter version of first embodiment 20, and has three compartments 124 for receiving refuse containers. As with device 20, a plurality of skis 126 are removably connected to housing 122. FIG. 21 is a side elevation view showing the three bases 132 and three dividers 140 of second embodiment 120. FIG. 22 is a perspective view of a wheel configuration of second embodiment device 120.

Figure 23:
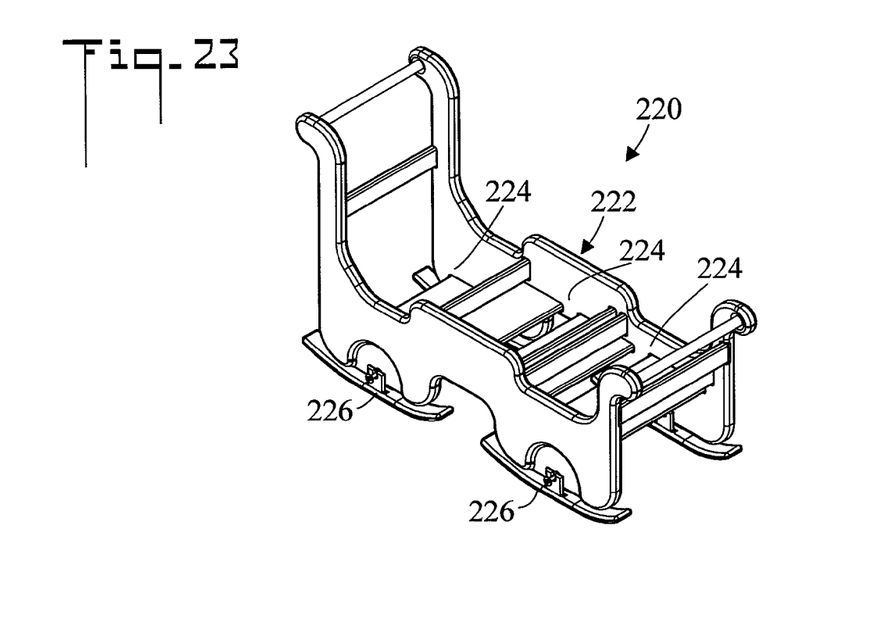
FIG. 23 is a perspective view of a third embodiment of the device.
Figure 24:
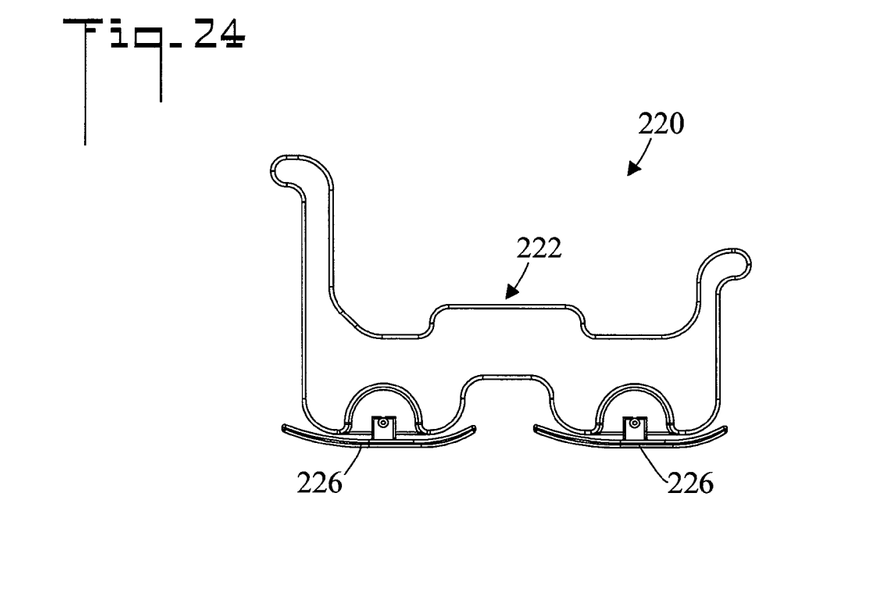
FIG. 24 is a side elevation view of the third embodiment.
Figure 25:
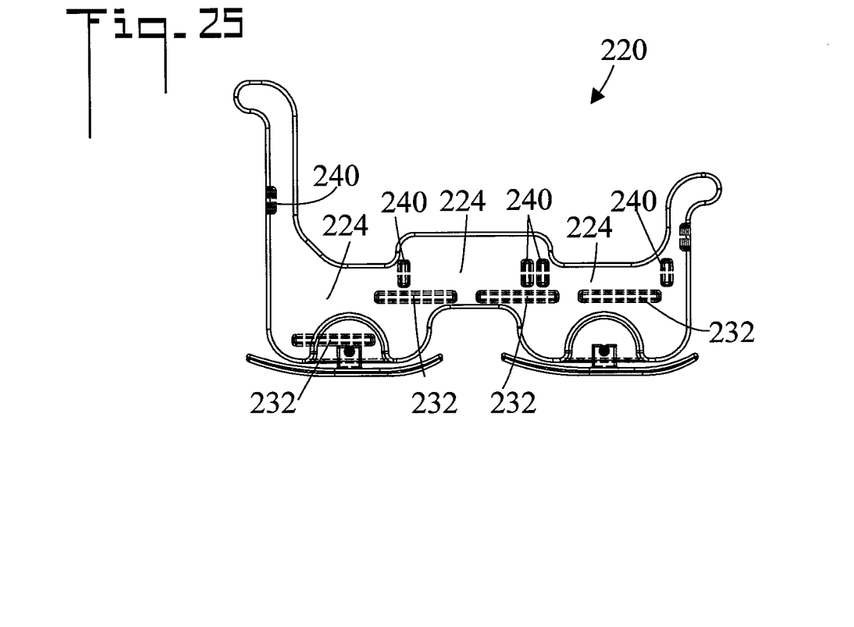
FIG. 25 is a side elevation view shown dividers and bases.
Figure 26:
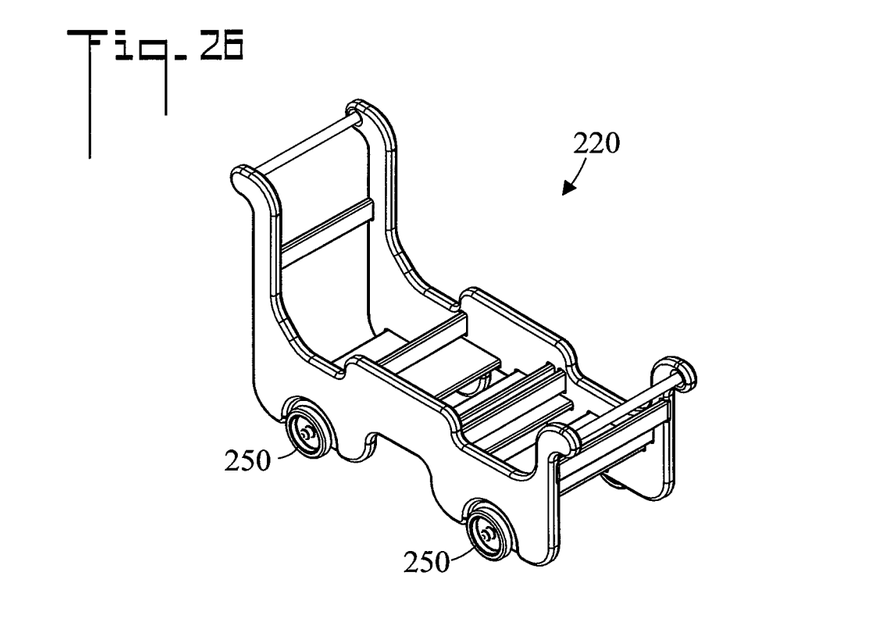
FIG. 26 is a perspective view of a wheel configuration of the third embodiment.

FIGS. 23 and 24 are perspective and side elevation views respectively of a third embodiment of the device, generally designated as 220. Third embodiment 220 is also a shorter version of first embodiment 20, and has three compartments 224 for receiving refuse containers. As with device 20, a plurality of skis 226 are removably connected to housing 222. FIG. 25 is a side elevation view showing the three bases 232 and three dividers 240 of third embodiment 220. FIG. 26 is a perspective view of a wheel configuration of third embodiment device 220. It is noted that third embodiment 220 is very similar to second embodiment 220, the difference being the location of the compartment 224 for receiving a tall refuse container.

Figure 27:
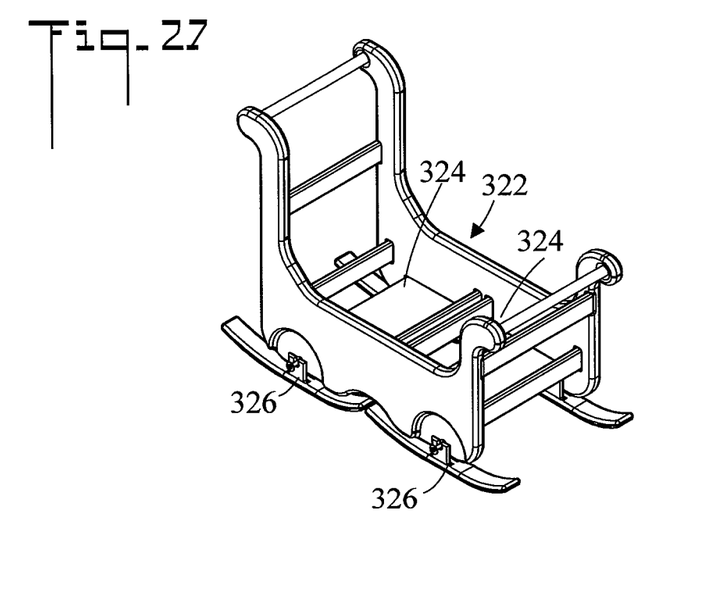
FIG. 27 is a perspective view of a fourth embodiment of the device.
Figure 28:
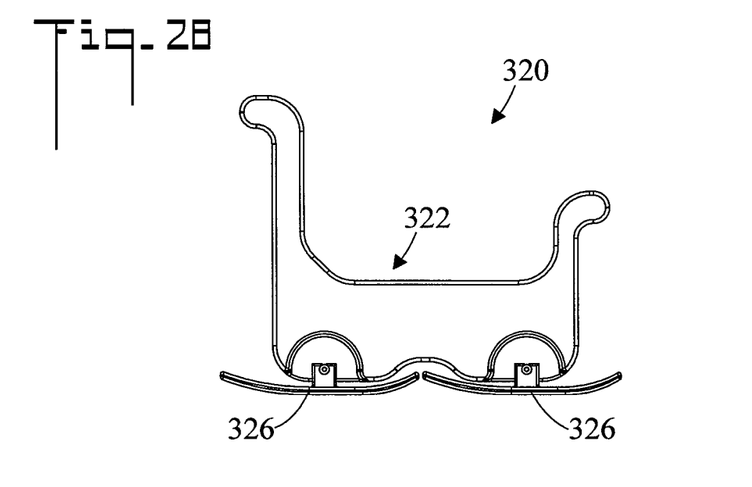
FIG. 28 is a side elevation view of the fourth embodiment.
Figure 29:
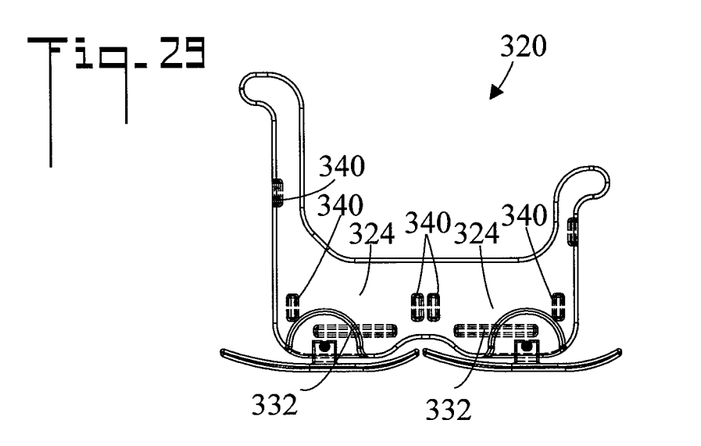
FIG. 29 is a side elevation view shown dividers and bases.
Figure 30:
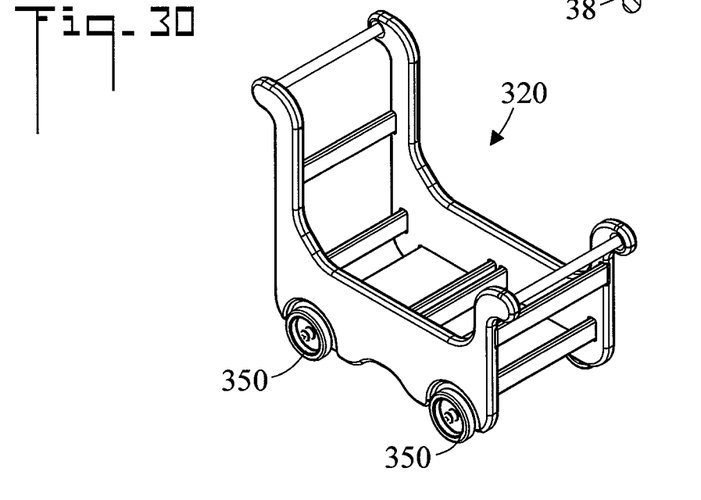
FIG. 30 is a perspective view of a wheel configuration of the fourth embodiment; and, FIG. 31 is a cross sectional view along the line 31-31 of FIG. 5.

FIGS. 27 and 28 are perspective and side elevation views respectively of a fourth embodiment of the device, generally designated as 320. Fourth embodiment 320 is also a shorter version of first embodiment 20, and has two compartments 324 for receiving refuse containers. As with device 20, a plurality of skis 326 are removably connected to housing 322. FIG. 29 is a side elevation view showing the two bases 332 and three dividers 340 of fourth embodiment 320. FIG. 30 is a perspective view of a wheel configuration of fourth embodiment device 320.

Figure 31:
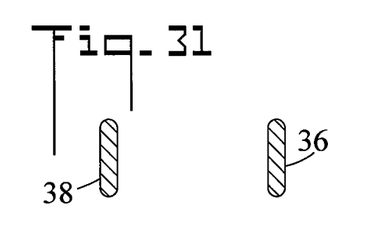

FIG. 31 is a cross sectional view along the line 31-31 of FIG. 5. It is noted that first side member 36 and second side member 38 have rounded edges around their entire perimeter.

In terms of use, a method for transporting a plurality of refuse containers 500 across either a support surface 700 or a winter support surface 600 includes: (refer to FIGS. 1-31)

(a) providing a plurality of refuse containers 500;
(b) providing a device 20 for transporting the plurality of refuse containers 500 across either the support surface 700 or the winter support surface 600, device 20 including:
   a housing 22 which is partitioned into a plurality of compartments 24, each compartment 24 shaped and dimensioned to receive a refuse container 500;
   a plurality of skis 26 removably connectable to housing 22, skis 26 used to move housing 22 across winter support surface 600;
   a plurality of wheels 50 removably connectable to housing 22, wheels 50 used to move housing 22 across support surface 700;
(c) connecting the plurality of skis 26 to housing 22;
(d) loading the plurality of refuse containers 500 into housing 22; and,
(e) moving housing 22 across winter support surface 600.

The method further including:
in (b), an axle 28 connected to housing 22; and,
in (c), connecting two skis 26 to axle 28.

The method further including:
in (b), an axle 28 connected to housing 22; and,
in (c), skis 26 pivotally connected to axle 28.

The method further including:
in (b), an axle 28 connected to housing 22; and,
in (c), skis 26 snapping onto axle 28.

The method further including:
in (b), each compartment 24 being vertically open so that in (d) refuse containers 500 can be loaded into compartments 24 without any interference.

The method further including:
after (e), removing refuse containers 500 from housing 22;
after (e), removing the plurality of skis 26 from housing 22:
connecting the plurality of wheels 500 to housing 22;
loading a plurality of refuse containers 500 into housing 22; and,
moving housing 22 across support surface 700.

The method further including:
in (b), an axle 28 connected to housing 22; and,
connecting two wheels 50 to axle 28.

The embodiments of the device and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the device and method should be construed as limiting the invention to a particular embodiment or combination of embodiments. The scope of the invention is defined by the appended claims.

I claim:

1. A device for transporting a plurality of refuse containers across either a support surface or a winter support surface, the device comprising:
   a housing which is partitioned into a plurality of compartments, each said compartment shaped and dimensioned to receive a refuse container;
   an axle connected to said housing;
   two skis removably connectable to said axle, said skis used to move said housing across the winter support surface;
   two wheels removably connectable to said axle, said wheels used to move said housing across the support surface;

said skis and said wheels not simultaneously connected to said axle;

said housing having a bottom;

each said compartment having a base which is disposed a height above said bottom;

said plurality of compartments including compartments having bases which are disposed at different heights above said bottom;

said housing including a first end compartment, an opposite second end compartment, and at least one center compartment disposed therebetween;

said base of said first end compartment and said base of said second end compartment having a lower height than said base of said at least one center compartment;

said housing including a first side member spaced apart from a second side member;

a plurality of dividers connected between said first side member and said second side member, said dividers partitioning said housing into said plurality of compartments;

said bases connected between said first side member and said second side member, said bases serving as supports for the refuse containers; and, said plurality of dividers not connected to said bases.

* * * * *